United States Patent [19]
Bisinger et al.

[11] 3,775,864
[45] Dec. 4, 1973

[54] RESPONSE-EVOKING APPARATUS

[75] Inventors: John M. Bisinger, Oak Park; David H. Verwolf, Chicago, both of Ill.

[73] Assignee: Multi-Channel Response Corp., New York, N.Y.

[22] Filed: Feb. 1, 1971

[21] Appl. No.: 111,428

Related U.S. Application Data

[63] Continuation-in-part of Ser. No. 854,956, Sept. 3, 1969, abandoned.

[52] U.S. Cl. ............................................. 35/9 A
[51] Int. Cl. .............................................. G09b 7/08
[58] Field of Search ....................... 35/9 R, 9 A, 9 E

[56] References Cited
UNITED STATES PATENTS

| | | | |
|---|---|---|---|
| 3,344,534 | 10/1967 | Anschutz | 35/9 A |
| 3,497,966 | 3/1970 | Gaven | 35/9 A |
| 3,516,176 | 6/1970 | Cleary et al. | 35/9 A |
| R23,030 | 8/1948 | Holt | 35/9 E |
| 3,609,878 | 10/1971 | Bender | 35/9 A |

*Primary Examiner*—Wm. H. Grieb
*Attorney*—McDougall, Hersh & Scott

[57] ABSTRACT

A machine for evoking responses from observers is provided by a display surface having discrete images projected upon discrete sections of the display surface. An observer may indicate his response to the images displayed or his response to an audible question by displacing one of the discrete sections. Control circuits responsive to data on the medium on which the images are stored for projection upon the display surface condition means to indicate the reaction of the observer and control the various modes of operation of the machine.

10 Claims, 23 Drawing Figures

PATENTED DEC 4 1973 3,775,864

INVENTORS
John M. Bisenger
David H. Verwolf
by McDougall, Hersh, Scott and Ladd   Att'ys

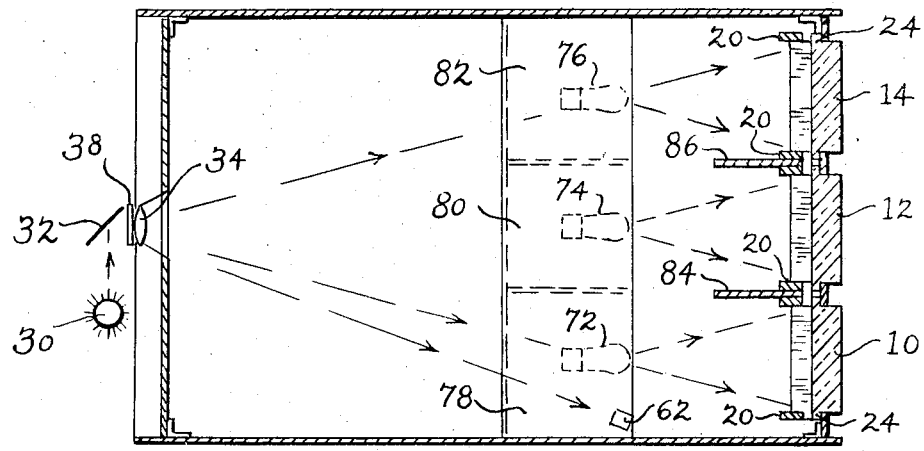
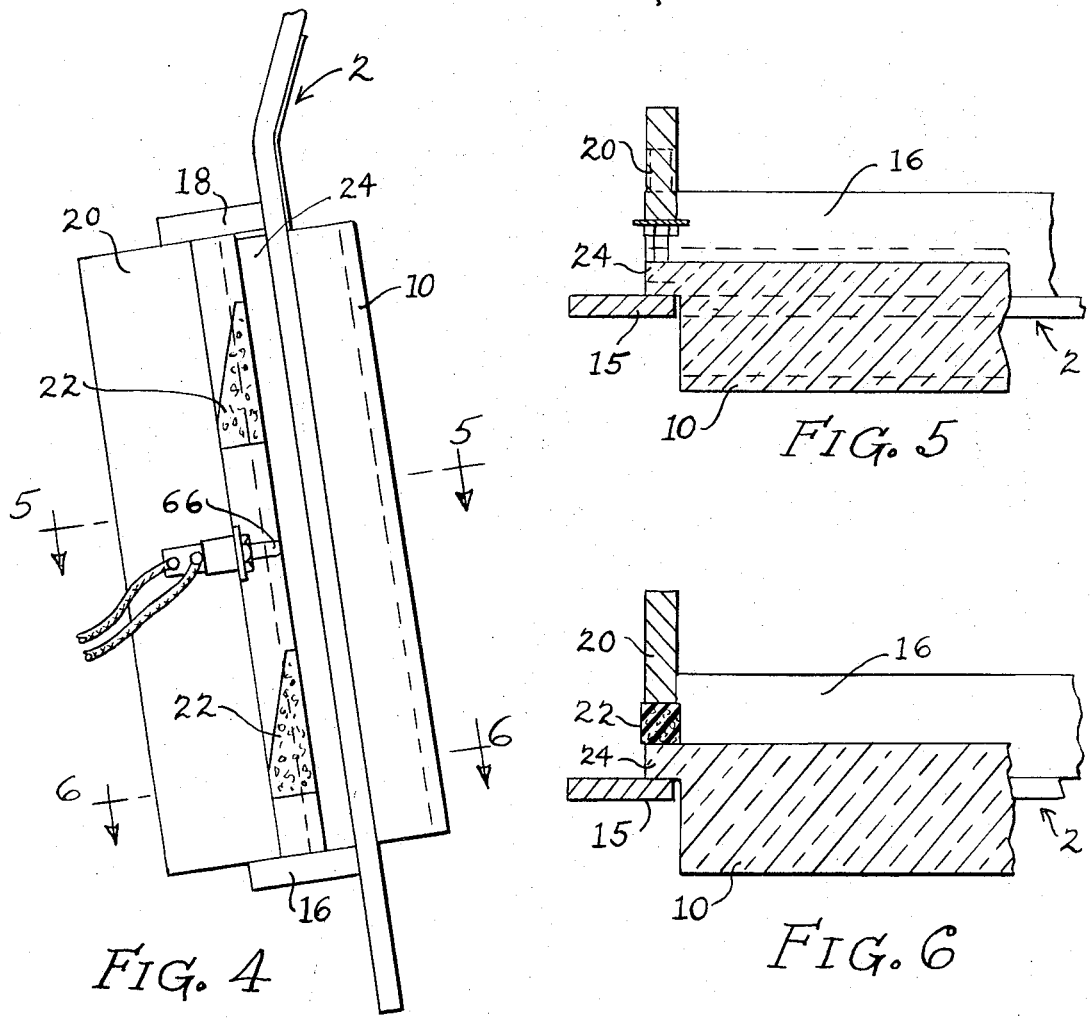

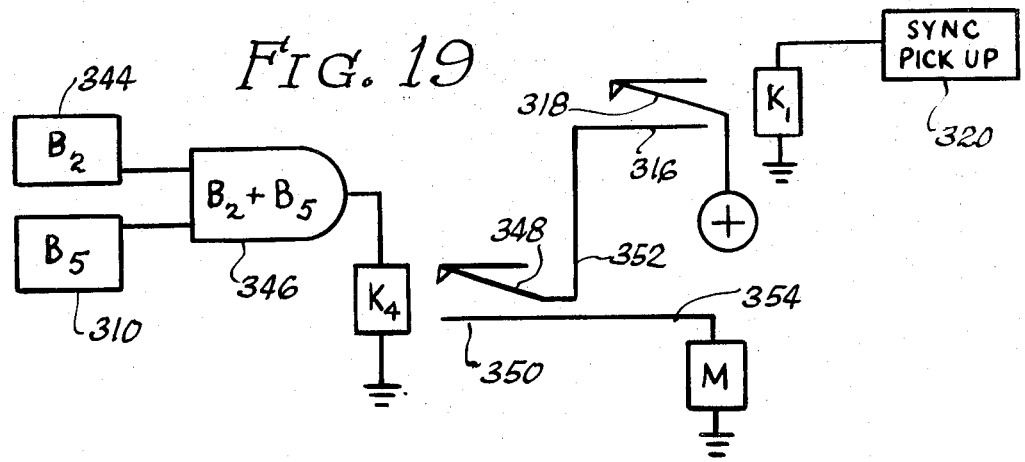
Fig. 19
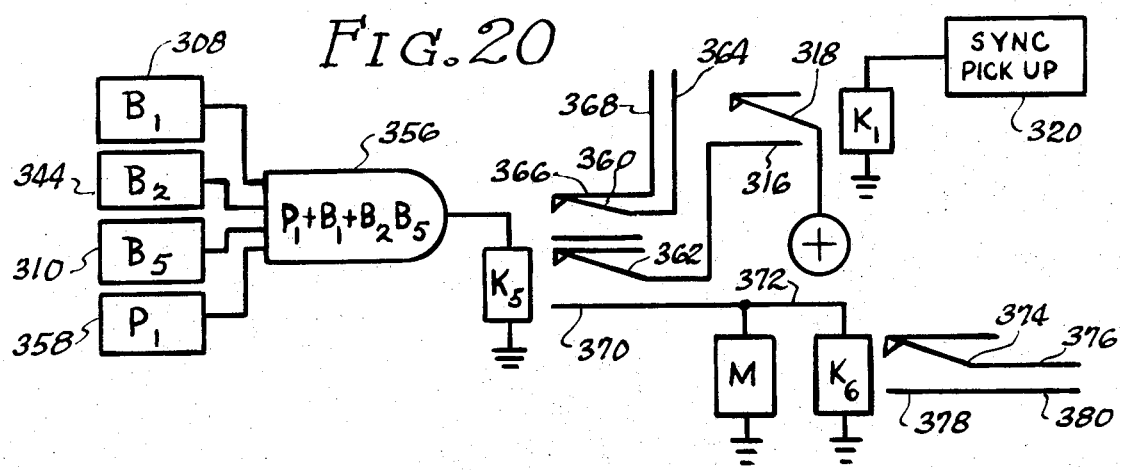
Fig. 20
Fig. 21

RESPONSE-EVOKING APPARATUS

This application is a continuation-in-part of our co-pending application Ser. No. 854,956 filed Sept. 3, 1969, now abandoned.

BACKGROUND OF THE INVENTION

This invention relates generally to apparatus for evoking responses to visual and/or audible stimuli. More specifically, it relates to educational, amusement or data-gathering apparatus using visual or audible stimuli and providing means for indicating the response of an observer to them.

In recent years, numerous machines and techniques have been developed and/or marketed which have for their purpose the production of an indication of the response indicating the understanding of an observer to a scene or a sound presented to him. Such machines have found ever-increasing usage in the fields of education, entertainment and surveying or otherwise determining the public response to a situation such as a product marketing survey. Generally, these machines involve posing a question and providing a means whereby the observer's answer may be given. In the educational and entertainment field there is also usually provided a means whereby the answer or response may be indicated, recorded or in some way evaluated.

The reception given these machines in the educational market can perhaps be explained by several factors. First, they have the ability to do in a more programmed or orderly fashion what has heretofore been done by teachers manually using books, decks of cards and the like, all requiring manipulation and the time of personnel with some degree or skill. Such personnel are not always available for a number of reasons and certainly are not available for the individual instruction of large numbers of people. This last-mentioned situation suggests a second factor contributing to the success of these machines. Essentially, a much greater understanding of the learning process has been gained in recent years, and it is now generally agreed that learning can be accelerated when there are several elements present: a direct interplay between the teacher and the pupil; the utilization of more than one of the senses; and an immediate indication to the pupil of the accuracy of his response. Insofar as teaching machines are concerned, it becomes possible to have a one-to-one relationship between pupil and teacher (and by "teacher" it is intended to include the concept of a machine or device filling at least part of that role); and when the teacher calls upon or evokes from the pupil a response which requires him to use more than a single one of the senses of sight, hearing, touch, etc. Particularly, it has been found that the learning process is enhanced if the pupil is required to undertake a physical act to indicate his understanding of the situation presented to him.

The machines with which the applicants are familiar are believed to suffer from various disadvantages. Bearing in mind that when the objective is typically to present the pupil with a scene or a set of images and then to evoke from him some expression of his understanding of a relationship in the presentation, to be most effective it is believed that it is highly desirable to provide the pupil with an immediate indication of whether or not his understanding is correct or otherwise corresponds to the relationship that it was decided to have him learn. To the extent that prior machines are complex or require extensive manipulation or in any way interpose a space difference or time lag between the presentation of the scene and the means for receiving the response of the pupil they tend to inhibit by slowing down or otherwise discouraging the pupil. This problem is particularly acute when such machines are used for the teaching with mentally, emotionally or otherwise handicapped persons. Such persons frequently have poor motor skills and do not have the ability to derive understanding when exposed to simultaneous demands upon their senses of sight and sound. This may seem somewhat at odds with the statement above that learning is accelerated when more than one sense is used but in this special situation the ability to use more than one sense must itself be taught. Thus, another problem with the prior art machines with which the applicants are familiar is that they make too many demands upon some pupils by requiring that he understand simultaneously a visual presentation of a scene or a set of images and an audible presentation of a question. These simultaneous demands plus the interposition of a spatial and time difference between the set of images and input means for receiving the observer's response limit the usefulness of such machines.

In a certain sense, in a prior art machine where a response input button physically remote from an image is suppose to represent an image or a portion of it, an intangible difficult-to-understand relationship has been introduced and for many the mental "leap" or association cannot be made. By way of specific example, suppose it was desired to present a color relationship and red was required to be identified as the correct answer. In the prior art, typically, there may be three or more response input buttons and for the purpose of that question, the pupil must understand that one of those buttons represents red. But the button itself is not red; it may be labelled A, B, or C or 1, 2, or 3. On the previous question, it may have represented a horse or a car. Further, that button has no meaning outside the environment of the machine for button number 1 is not "red" in the rest of the pupil's world. The problem for the handicapped pupil is formidable, almost insurmountable, for the truth is "red" and something has been interposed between him and the truth. The mental transition required can be too much, learning is slow and attention span limited. Therefore, with all their other advantages, this disadvantage of the "interposition" of space, time and truly unrelated and non-universally accepted symbols of the truth limit the usefulness of the machine.

To overcome these problems this invention has for an object the provision of apparatus to evoke an observer's response by inviting him to communicate directly with a set of images and have the accuracy of his understanding as shown by the response indicated.

Another object of this invention is to provide an instructional apparatus which does not interpose truly remote, truly unrelated non-universally accepted symbols to represent the concept desired to be taught.

The utilization of teaching machines, of course, requires prepared material to be displayed by the machine. As with much data or information, display or handling equipment, it has become customary to distinguish between "hardware" and "software." In connection with teaching machines, "hardware" is usually taken to be the machine itself while "software" has reference to the content of the material presented by the machine. Usually this material is an input to the machine in the form of a recording medium such as photographic film or slides, magnetic tape or printed material to be displayed. The organization of this material into a particular sequence for presentation permits it to be spoken of as being programmed. This sequence or program is usually arranged so that the concepts desired to be taught become progressively more difficult as the pupil demonstrates understanding at one level.

There is, of course, an intimate relationship between the structure of a specific machine, the medium on which the programmed material is recorded and the format of the material. Consequently, for a given machine there are limitations as to how the material may be presented. The prior art systems known to the applicants herein all require what may be called "linear programming," that is, a sequence of questions which become progressively harder to advance from one level of difficulty to a higher level where it is necessary to manipulate or pass through all of the material inbetween. In all cases, this is time consuming and in many it becomes boring for the pupil and instructor causing them to lose interest.

Therefore, it is another object of this invention to provide a novel apparatus useful as an instruction device which may be programmed so as to present a sequence along one level of difficulty or alternatively provide for the parallel programming of difficult material such as material devoted to the same or related subject matter but at different conceptional levels.

It is still another object of this invention to provide a novel audio visual apparatus in which a medium on which images are recorded to be visually present also includes indicia for coaction with control means in the apparatus whereby the apparatus may have a number of different modes of operation.

As of this time, there are a number of teaching machines in use for which much programmed instructional material has been prepared. These materials represent a substantial investment on the part of their users and even though a new device using different approaches and requiring different material were available, it nevertheless would be a measurable advantage if such a machine were able to use existing material. Thus, as will be described in detail, a machine in accordance with this invention utilizes an input recording medium having a format particularly adapted to it. However, when it is desired to use conventional recording media already in existence, it is possible to do so.

SUMMARY OF THE INVENTION

These and other objects are achieved by providing a response-evoking apparatus having a surface having discrete sections on which discrete images may be displayed within the boundaries of each section and which can receive an indication of an observer's response when he physically touches or otherwise affects one of the sections.

Another aspect of the invention includes a medium on which is recorded a set of images to be displayed on the discrete sections as well as coded indicia representing the response it is desired to evoke. In addition, coded indicia are provided on the medium to control various machine functions.

BRIEF DESCRIPTION OF THE FIGURES

The invention itself is set forth in the claims appended hereto and forming a part of this description while the structure and operation of various embodiments may be understood from the description in conjunction with the drawings in which:

FIG. 3 is a sectional view taken along the lines 3—3 of FIG. 2;

FIG. 4 is a vertical sectional view of a display segment forming a part of the invention;

FIG. 5 is a sectional view along the lines 5—5 of FIG. 4;

FIG. 6 is a sectional view along the lines 6—6 of FIG. 4;

FIG. 19 is an illustration of the circuit logic which is provided to obtain a second mode of control capability;

FIG. 20 is an illustration of the circuit logic which is provided to obtain a third mode of control capability;

FIG. 21 is an illustration of the circuit logic which is provided to obtain a fourth mode of control capability;

DETAILED DESCRIPTION

Figure 1:
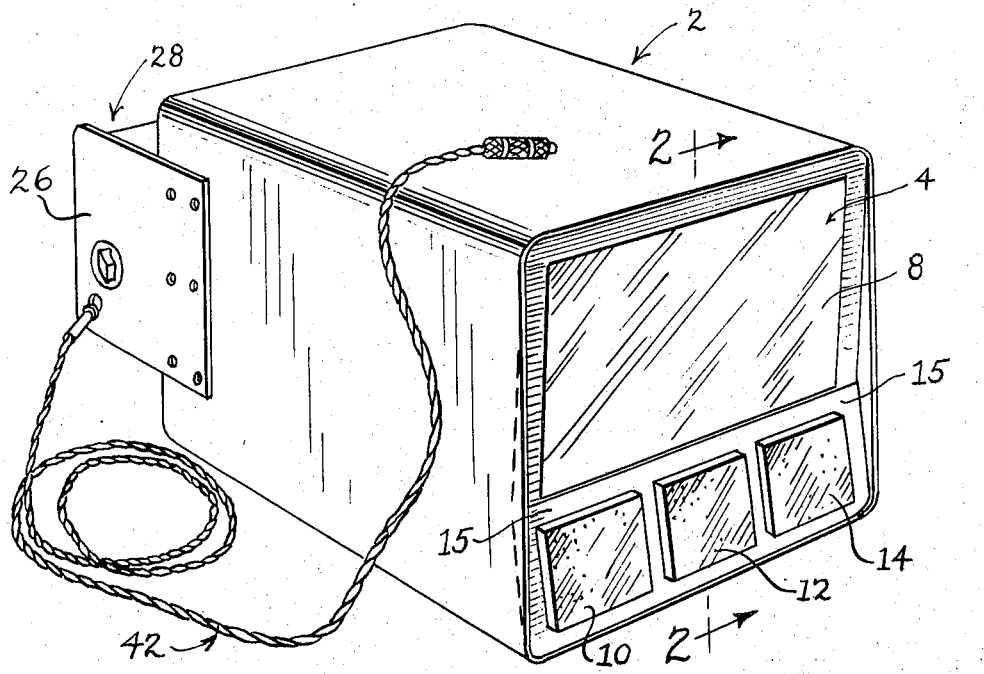
FIG. 1 is an isometric view of an embodiment of the invention.
Figure 2:
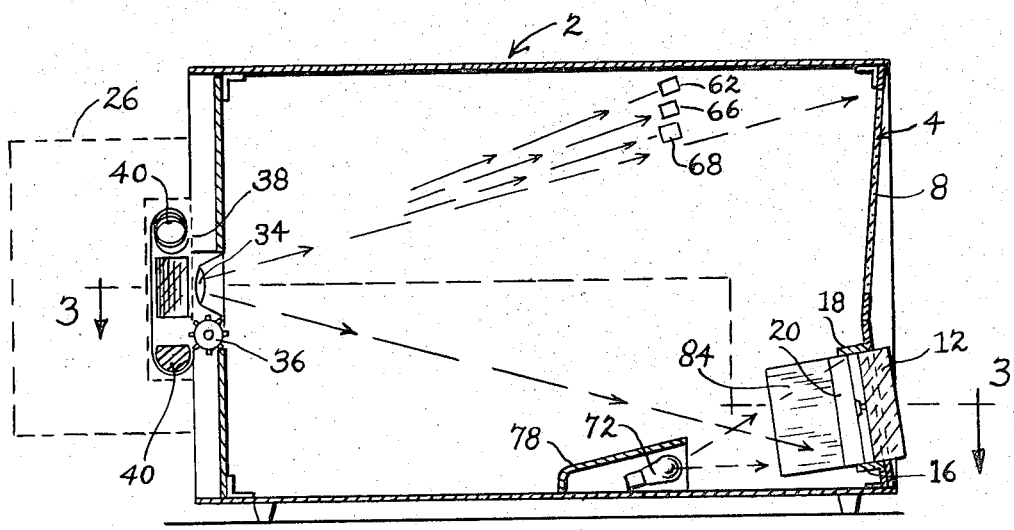
FIG. 2 is a sectional view along the lines 2—2 of FIG. 1.

An embodiment of apparatus in accordance with the invention is shown generally in FIG. 1 and the specific construction of that embodiment is illustrated in FIGS. 2 and 3.

A light tight housing 2 which may be generally rectangular in cross section and designed or styled as desired is provided with a display surface or screen 4 at its front end. The screen 4 may be held in the housing 2 by any chosen means so as to be removable for maintenance and other purposes to be described. The screen is this embodiment is constituted by four discrete sections 8, 10, 12 and 14 of a light transmitting material of the types commonly used to form projection screens. The spaces 15 between each discrete section are selected to be of material which will not transmit light so that when the screen is illuminated by light sources inside the housing only the sections 8, 10, 12 and 14 or any one of them will transmit light depending on the location and state of energization of light sources in the housing 2. Thus, in this embodiment, there is provided a discrete screen section 8 which occupies most of the display surface and three smaller sections 10, 12 and 14 spaced along the bottom of the section 8. Each section may be separately illuminated or have separate images projected upon their surfaces.

The discrete sections 10, 12 and 14 as shown in detail in FIGS. 4–6 are mounted in such a way as to be movable. In this embodiment, the mounting is such as to permit their displacement generally longitudinaly of the main axis of the housing 2. Means for mounting movable discrete sections 10, 12 and 14 may be provided by transversely extending supports 16 and 18 secured to the interior side of the screen 4 in an area marked by the spaces 15 so as not to be visible from the exterior. A plurality of vertical supports 20 extend between the transverse supports 16 and 18. The supports 20 are spaced from the interior side of the screen 4 and carry resilient means 22, which in this embodiment take the form of a compressible foamed plastic, which when compressed exerts an outward force.

Each of the screen sections 10, 12 and 14 in this embodiment is formed from a transparent plastic material by a suitable technique so as to be a rectangular block of some thickness with a pair of shoulders 24 extending vertically in the space between the vertical supports 20 and the interior side of the screen 4. By virtue of this arrangement, the discrete sections 10, 12 and 14 are held in position in the screen 4 and are urged outwardly by the force of the resilient elements 22.

Mounted by brackets 26 on the rear of the housing 2 is a film projector 28. The particular projector illustrated and its manner of mounting is for purposes of illustration only as any suitable device for the projection of a length of photographic film of any one or the standard sizes and sprocket hole arrangements may be used. The projector in this instance comprises a light source 30 which is directed upon an angled mirror 32 and reflected from the mirror through a suitable lens system 34. The projector also includes a film advance sprocket 36 which engages the sprocket holes in a length of film 38 trained over guide wheels 40.

The projector may be controlled to advance the film strip so to project one frame for a predetermined time and then advance to the next. Alternatively, it may be controlled manually, for instance, at a remote location by providing a cord and pushbutton set 42 to be actuated by an operator.

In addition to having the basic structure described, it will be found desirable in some applications to provide a sound presentation in conjunction with images being projected upon the screen sections 8, 10, 12 and 14. Such a sound presentation may be provided by a recording system using magnetic tape with suitable pickups and sound amplifiers. Further, it may be found useful in some applications to synchronize the sound presentation with the images being projected by providing a recorded signal on the magnetic tape which will be effective to advance the film as the sound presentation proceeds. There are a number of commercially available combination sound and film strip projectors available for these purposes. One such is sold under the name "MASTERMATIC 1" by the Elco Corporation of Montgomeryville, Pennsylvania. Others, of course, may be used for as will be described hereinafter the film necessary for the effective utilization of this invention may be of standard size and possess standard sprocket holes. Film as such need not be used for slides and other forms of recording media may be used equally well.

Figure 8:
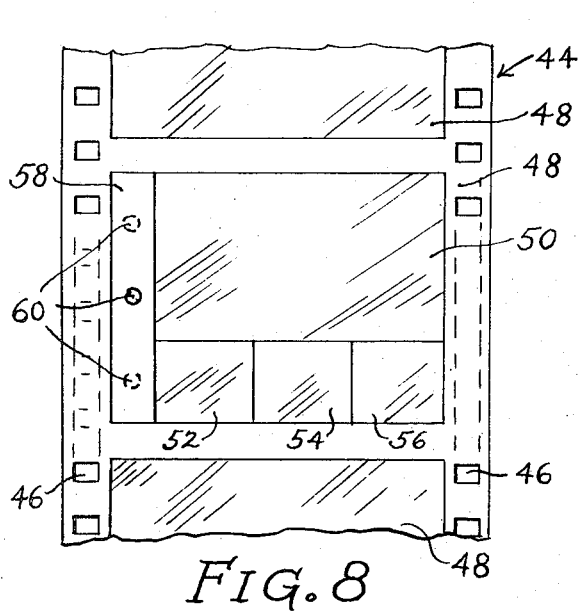
FIG. 8 is an illustration of a length of photographic film constituting an aspect of the invention.
Figure 9:
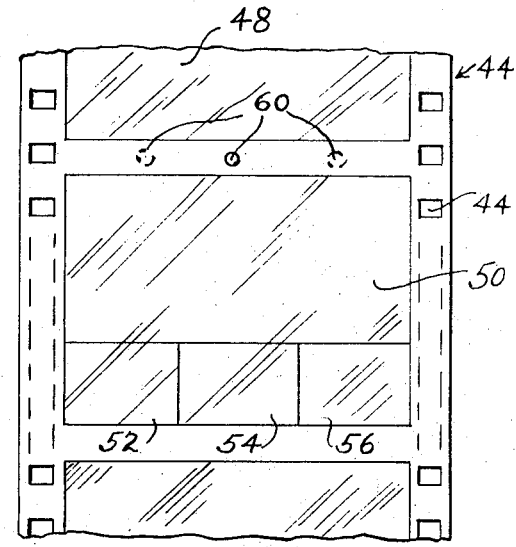
FIG. 9 is an illustration of an alternative embodiment of a length of photographic film constituting an aspect of the invention.
Figure 10:
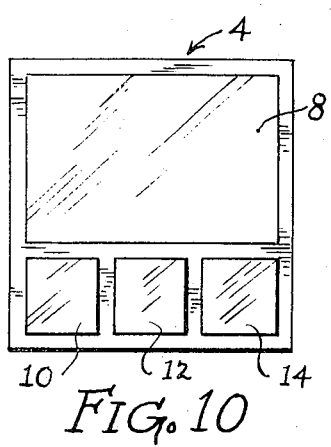
FIG. 10 is a front view of the display surface of the embodiment of FIG. 1.

The screen 4 being provided with four discrete screen sections in the embodiment of FIG. 1 is adapted to have four discrete images projected upon its surface. Films forming a part of this invention for projecting such images are shown in FIGS. 8 and 9. In FIG. 8, such a film may take the form of a length of film material 44 having sprocket holes 46 and as is customary a plurality of frames 48. Each frame 48 when exposed and developed will have four discrete sections, 50, 52, 54 and 56. Provided along the periphery of each frame 48 is an area 58 in which may be provided coded indicia 60 for a purpose to be described in detail hereinafter. In the embodiment of FIG. 8, the indicia 60 are provided within the frame 48, whereas in the embodiment of FIG. 9, the indicia 60 may be provided in the spaces between the frames.

When the film strip is used in conjunction with the projector 28, the discrete images on the sections 50, 52, 54 and 56 will be projected and appear upon the surfaces of the discrete screen sections 8, 10, 12 and 14, respectively. By virtue of the light shielding provided by the spaces 15 on the screen 4 each image will have a discrete image and will appear only within the boundaries of its associated screen section.

When used for educational purposes at a relatively low level, a typical set of images may be as follows. If it is desired to teach color relationships and differences, the film 44 may be printed so that a frame 48 has the section 50 in red while the sections 52, 54 and 56 may be printed in red, blue and green. It would then be decided that the person using the machine identify which of the sections 52, 54 and 56 corresponds to the section 50. This example is obviously one of the most simple types of presentations that can be made. A slightly more difficult one would be to print the section 50 in red and to print the letters forming the words "red," "blue" and "green," respectively, in the sections 52, 54 and 56 so that when the screen section 8 is red the words red, blue and green will appear in the sections 10, 12 and 14, respectively. It would then be desired to have the observer indicate that he understands that the letters "r," "e," and "d" forming the word red stand for the color he is seeing in section 8.

In order to encourage an observer to indicate his understanding of the relationship between the images which are being presented to him on the various discrete screen sections, the invention by inviting him to and facilitating his touching of the images also includes apparatus to present to him an indication of the accuracy of his understanding. This apparatus is constituted by the general circuit arrangement illustrated in FIG. 7. In this figure, a circuit connected to a suitable source of electrical energy comprises generally in a series configuration, a means to enable one of the screen sections 10, 12 or 14, when displaced by an observer pressing upon it, to provide an indication of the observer's understanding of the relationship of the set of projected images. This means may be characterized as one enabling one of the movable screen sections when a physical impression is made upon it by an observer to actuate a response indicating means. This enabling means includes a circuit conditioning means such as a light sensitive semi-conductor element 62 arranged to close a switch 64 in the series circuit when light impinges thereon. This light will be projected from one of the coded indicia 60. In this embodiment, the coded indicia takes the form of fixed locations adjacent the edge of the film frame which when the film is printed, one or more such locations will permit the passage of projected light. If the light sensitive element 62 is connected to be associated with the screen section 10, the additional light sensitive elements 66 and 68 are connected to be associated with the screen sections 12 and 14, respectively. The elements 62, 66 and 68 are mounted inside of the housing 2 and aimed so as to receive light from one of the coded indicia 60. The exposed portions are spaced from each other so that the relatively narrow beam of light issuing therefrom will impinge upon only one of the light sensitive elements 62, 66 and 68.

Referring again to one of the basic modes of utilization suggested above, if the screen section 8 has the color red projected thereon and the screen sections 10, 12 and 14 have the words red, blue and green projected thereon, then the light projecting through the film frame 48 would be caused to impinge upon only the light sensitive elements 62. When energized in this fashion, it will be effective through suitable well known circuitry to close the switch 64 and enable the screen section 10 when displaced by an observer to provide an indication that his understanding that the letters "R," "E" and "D" form the word used to represent the illustrated color. Were the observer to displace the screen sections 12 or 14, inasmuch as the switches in their control circuits corresponding to the switch 64 would not have been closed, no positive response will be given.

Figure 7:
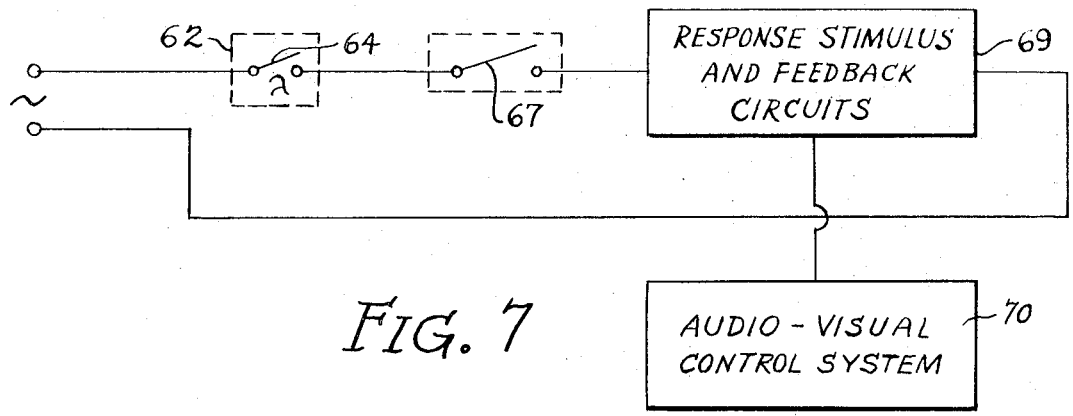
FIG. 7 is a schematic diagram of an electrical circuit forming a part of an embodiment of the invention.

The remainder of the circuit in FIG. 7 includes a switch 67 in series with the switch 64. Mechanically, this switch is physically located adjacent its associated screen sections 10, 12 or 14 so as to have its actuating plunger depressed to close the switch when the screen section is displaced by exerting pressure upon its face. Repreented in this figure in a schematic fashion is an audio visual control system 70 which in accordance with the preceding description may be constituted by the projector 28 and an associated audio system utilizing a magnetic tape. The circuit includes what may be generally characterized as a response stimulus and feedback circuits 69. The response stimulus is, of course, the presentation on the discrete screen sections while the feedback circuit is constituted by a suitable means to provide the observer with an indication that his understanding or response is the correct one or the one otherwise desired to be created.

The feedback to the observer in the illustrated embodiment takes the form of electric lights 72, 74 and 76 associated with each one of the movable screen sections 10, 12 and 14, respectively. Each of the lights 72, 74 and 76 is shielded from the other by suitable light shieldings 78, 80 and 82 and aimed toward the interior surface of its associated screen section. Additional light shieldings 84 and 86 may be provided between the screen sections so as to insure that when the light associated with a particular screen section is illuminated, its light will fall exclusively upon the desired screen section. Thus, when one of the lights 72, 74 and 76 is energized, it will light up its associated screen with such intensity as to block out the image being projected thereon by the projector 28 through the film strip 44 and will be transmitted through the screen section and seen by the observer.

The overall operation of the system may take place in a number of different ways. A first mode of operation where the system is being utilized for the teaching of handicapped persons would involve the preparation of suitable film strips 44 by printing thereon in the larger section 50 image intelligence as for instance, a color or a word or a scene and the printing in any one of the smaller sections 52, 54 and 56 a similar color, word or scene on any image bearing a relationship to the image printed in section 50. The remaining smaller sections could then be painted in some other color, word or scene which does not bear a relationship to the image in section 50. The correct one of the sections 52, 54 or 56 would then be indicated by the use of relationship intelligence in the form of the coded indicia 60. Thus, looking at FIG. 8, the topmost indicia would represent the section 52, the middle indicia the section 54 and the bottom one the section 56. As illustrated, these indicia are selected to be light transmitting portions of the film. If the correct answer appears in section 52, only the topmost indicia would be printed so as to permit the passage of light therethrough. When the particular frame of the film strip 44 is in a position to be projected by virtue of its being imposed between the light source and the lens system, the set of images would appear on the face of the various screen sections. At the same time, assuming the correct answer appears in section 52, its associated photocell 62 would be energized. The energization of the photocell 62 in the manner well known in the art would then be used to close the switch 64 conditioning the circuit associated with screen section 10 so that upon displacement of that screen sction by the exertion of pressure upon it by an observer the switch 66 will be closed. The closure of this switch would energize the light 72 causing the screen section 10 to be illuminated. Were the observer to press either the screen section 12 or the screen section 14 nothing would happen as their associated photocells 62 and 68 would not be receiving light from their associated indicia 60. The observer could then operate the remote control cable and button 42 to advance the film strip to the next frame and cause to be displayed another set of images to be examined by him and to which he may indicate his response as before.

In teaching at another level the tape recorder may be used and synchronized with the film strip so as to present an audible question to be answered by the observer pressing upon the appropriate screen section. The machine may be used as before by the observer to indicate his answer to the question.

Obviously, when utilized in the educational field, a great number of variations in technique are possible depending upon the capabilities of the pupil and the desires of the instructor. A most significant point is that the pupil may contact directly the images and not experience the intervention of remote switches or other means. A direct relationship with the set of images is prescribed on apparatus which evokes a response even from that pupil who cannot comprehend a verbal instruction or question and who would have great difficulty in manipulating switches which have a remote and rather abstract relationship to the scene in front of him.

While the invention has been described in major part in connection with the field of education, it has application also in any situation where it is desired to ascertain an observer's response to a situation. For instance, it may be applied as a market survey device by projecting a request to indicate a brand preference by touching the screen section showing that brand. To hold the interest of the observer in this situation it would be desirable to provide him with an indication of his answer. This could be done by causing the light associated with the screen section he has displaced to be energized. At the same time suitable data gathering and recording means could be provided to make a record of his answer. More elaborate data gathering and audible and visual presentation apparatus could tell him, the viewer, he agrees with a certain percentage of other participants.

Related somewhat to the field of education, but slightly different, the system can be used as an amusement question and answer device. In this case, it might be coin-controlled and scoring means provided to exhibit to the player his score, such as the number of correct answers he has in a series of questions.

Figure 11:
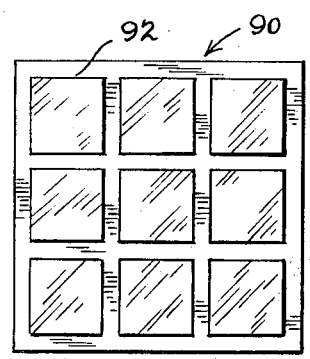
FIG. 11 is a front view of the display screen of an alternative embodiment of the invention.

In another embodiment of the invention shown in FIG. 11, the viewing surface 90 is constituted by a plurality of equal size discrete screen sections 92. When a viewing surface of this type is used, the film strip would accordingly be modified so as to present nine discrete images upon that surface each within the boundary of one of the sections 92. A relatively complicated question could be presented in an audible manner derived from a magnetic tape recording and the indicating means would be modified accordingly.

The response-evoking capabilities of this invention can be used in an embodiment such as that shown in FIG. 11 in the following manner. By providing a film strip which could be indexed to various frames either manually or push-button operating selector means, a number of images may be projected on the various screen sections; the images could be a series of questions which the viewer might want to ask. He would then ask the question by actuating the screen section on which the question appears. His actuation of that screen section could cause an answer to be given to him in any one of a number of forms, for instance, a printed answer could be dispensed by various means. An audible answer could be provided from a magnetic tape indexed to the answer when the corresponding screen section is actuated. Such a system might find utility in any place where a large number of people are passing through and are seeking information. For instance, at an airline terminal, there may be a whole series of questions related to departure or arrival times of various flights, the kinds of services available, or the location of various airport facilities. The kinds of questions that could be expected to be answered could be grouped on one or more frames, each frame projecting nine of these questions if the embodiment of FIG. 11 is used or more if an embodiment having some other number of screen sections such as twelve or sixteen is used. An observer may then manipulate the machine to have the questions presented to him which are concerned with his area of interest and then actuate the particular screen section asking the question he has in mind and receive his answer as indicated. As with the other embodiments, a response is being evoked from an observer and he is communicating his response directly to the representation which matches his response and receiving an indication, in this case an answer to his question.

Figure 12:
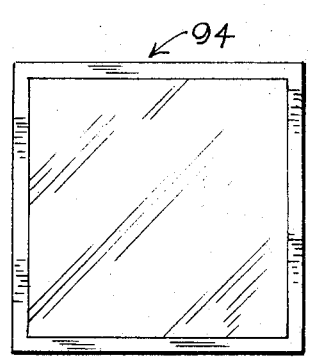
FIG. 12 is a front view of a display screen which may be useful with the invention.

In order to enhance the utility of the invention and to facilitate its usage, it is contemplated that a viewing section 94, as shown in FIG. 12, may be provided which is conventional and may be substituted for the viewing sections 4 or 90. In this manner, conventional film strips which are presently in use may be projected upon the viewing surface so that their usefulness may be preserved. This capability enhances the value of this system to persons or institutions having existing libraries of conventional film strips.

Figure 13:
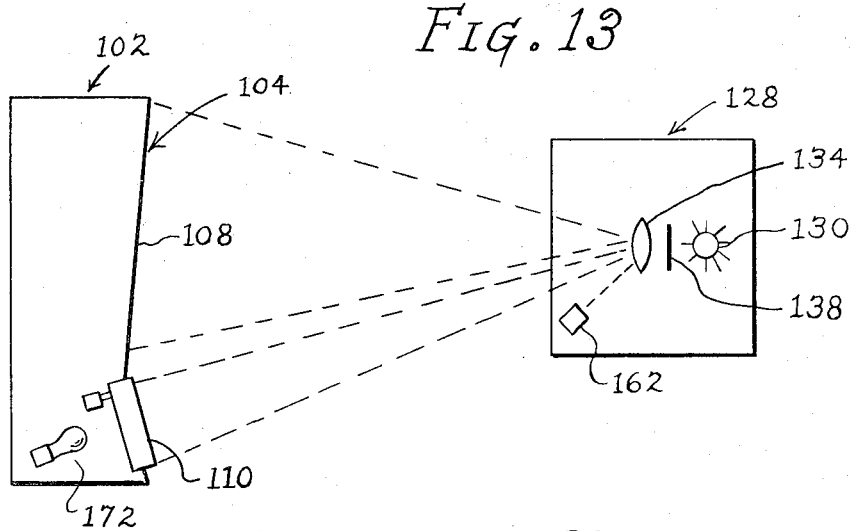
FIG. 13 is a diagrammatic illustration of another embodiment of the invention.

The physical construction of the embodiments described have comtemplated apparatus where the projector is to the rear of the display surface. However, this is a matter of choice for front projection can be used as shown in FIG. 13. In this figure, a housing 102 is of such a size as to accommodate a display surface 104 having a larger fixed section 108 and a plurality of movable sections, one of which, 110, is shown.

Spaced to the front of the display surface 104 is a projector 128 having a light source 130. Imposed between the light 130 and a lens system 134 is a length of film 138 having the format illustrated in FIGS. 8 or 9. A light sensitive semiconductor is positioned within the housing of the projector to be responsive to the coded indicia associated with each frame of film so as to selectively enable the circuits associated with the movable screen section 110 and its associated light 112. The electrical circuits are as described previously and similar modes of operation may be used.

Figure 14:
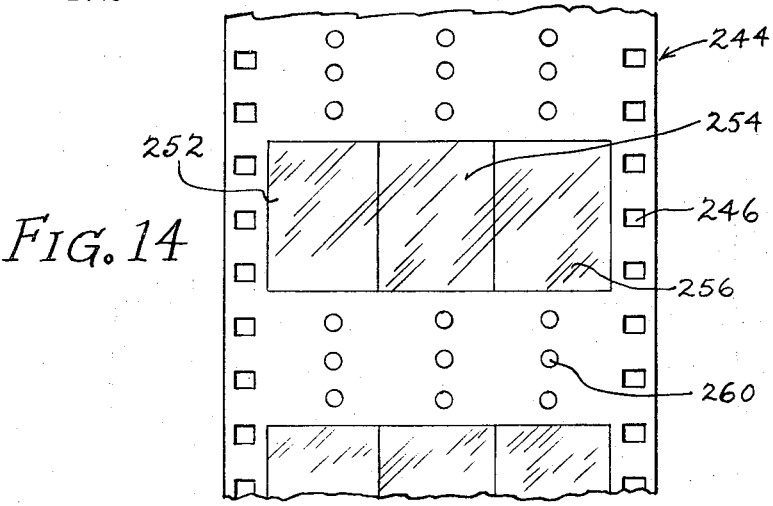
FIG. 14 is an illustration of a length of film useful with the embodiment of an aspect of the invention shown in FIG. 16.
Figure 15:
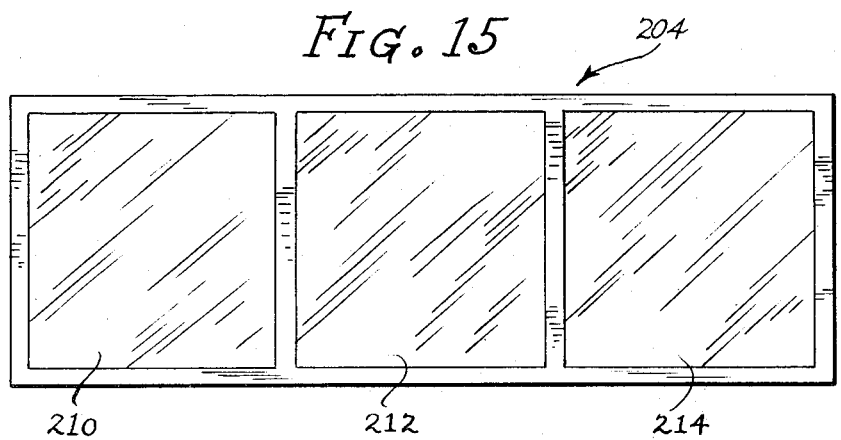
FIG. 15 is an illustration of a display surface useful in another embodiment of the invention.

In a number of situations, it may be desired to provide for a more sophisticated system than the multiple choice kind of operation described. One embodiment useful for such modes of operation includes the elements of FIGS. 14 through 16. In FIG. 15, the viewing surface 204 may be provided with three discrete movable sections 210, 212 and 214. With this arrangement, it may be desired to choose questions which not only encourage the observer to make a selection of an appropriate movable section to indicate his response, but also to choose questions which would call upon him to make his selection in a desired sequence. Thus, the observer could be asked to depress the screens in the order of ascending or descending numbers and various numbers would be displayed within the boundaries of each discrete screen section.

Figure 16:
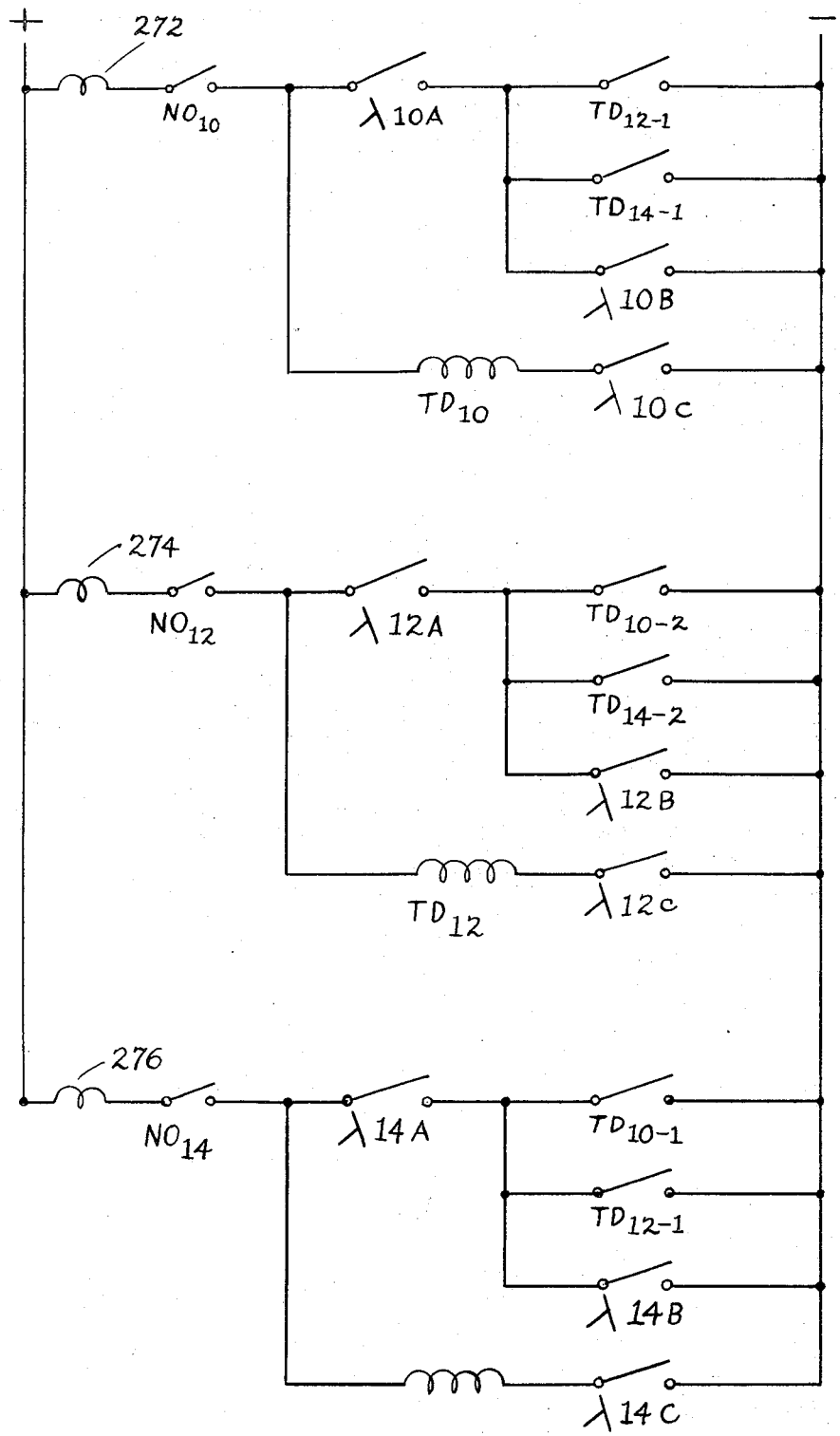
FIG. 16 is a schematic diagram of a control circuit forming part of an embodiment of the invention.

FIG. 16 illustrates in a schematic form a control circuit to be used as part of this invention by which this kind of question could be answered and the correctness of the answer indicated to the observer. Each screen section 210, 212 and 214 would have associated therewith a light source 272, 274 and 276 in the manner previously described. The push-button switches associated with each screen section are designated as normally open switches $NO_{10}$, $NO_{12}$ and $NO_{14}$. Inasmuch as the control circuit for each screen section is identical, only that associated with screen section 210 will be described in detail while the mode of operation of the circuits and their interrelationship will be explained. Thus, the circuit associated with the screen section 210 includes the light source 272 in series with switch $NO_{10}$. Connected in a first series circuit with the switch $NO_{10}$ is a light-controlled switch 10A. This series circuit may be completed through any one of three normally open switches $TD_{12-1}$, $TD_{14-1}$ or 10B. Another series circuit is formed by the winding of a time delay relay $TD_{10}$ and the normally open light-controlled switch 10C. As stated, the circuits for the screen sections 212 and 213 are similar and each switch bears its requisite subscript indicating the circuit with which it is associated.

It will be seen that a total of nine light-controlled switches are provided. Therefore, the film strip and its coded indicia should be modified accordingly. Such a modification is illustrated in FIG. 14. Here the film strip 244 provided with sprocket holes 246 has three sections, 252, 254 and 256, on which images may be printed and projected. The indicia by which the light-control switches are to be activated may appear between the sets of images 252, 254 and 256. As before, the light-control switches may have their light sensitive elements aimed to respond to light passing through any one of the selected indicia locations.

In this embodiment of the invention, a number of modes of operation are possible. Thus, a question could require that the observer indicate his response by displacing the screen section 210. In this case, indicia would be provided on the film strip to cause light to impinge upon the photosensitive elements of light-controlled switches 10A and 10B to close these switches and thereupon provide a circuit to be completed when the screen section 210 is depressed closing the switch $NO_{10}$. This will energize the light 272 indicating that the answer given is correct or otherwise the one sought. Similarly, if the correct answer requires that the screen section 212 be displaced, switches 12A and 12B will be closed conditioning that circuit, and when the answer requires that the screen section 214 be depressed, light-control switches 14A and 14B would be closed.

In another mode of operation, the answer may require that all three screen sections be displaced by the observer in which case their associated light-control switches A and B will be closed by causing light to impinge upon the photosensitive elements controlling those switches.

A more complicated question may be posed requiring the screen sections to be displaced in a certain sequence. For instance, the question may require that the screen section 212 be displaced first followed by the screen section 210. In this situation, the coded indicia would be effective to cause the closure of switches 12A and 12B so that when the screen section 212 is displaced, the switch $NO_{12}$ will be closed energizing the light 274. At the same time the switches 12A and 12B are closed the switch 12C is closed by causing light to impinge upon its photosensitive element and the switch 10A is closed by causing light to impinge upon its photosensitive element. Therefore, if the observer answers correctly by displacing the screen section 212 first so as to close the switch $NO_{12}$ with the switch 12C closed, the time delay relay $TD_{12}$ will pick up and after a predetermined time interval will close the switch $TD_{12-1}$. When the switch $TD_{12-1}$ is closed after the predetermined time delay, a conditioning circuit for the closure of switch $NO_{10}$ associated with the screen section 210 will be completed because the light-operated switch had previously been closed by virtue of its response to the coded indicia. Thus, after displacing the screen 212, if the observer displaces the screen 210, a complete circuit will be provided to permit energization of the light 272.

When it is decided to propound a question which calls for still a third screen to be displaced, all that is necessary is to utilize the coded indicia to energize the light-controlled switches in the appropriate manner.

The invention has been described in connection with various specific embodiments thereof. Obviously, the precise mechanical configuration of the parts may be varied to accommodate different design and manufacturing techniques and the materials utilized. For instance, the screen sections need not be rectangular but may be shaped as triangles, circles, etc. as desired. Likewise, the arrangement of the coded indicia on the film strip may be varied to accommodate presentations of varying complexity. Thus, it would be possible to provided coded indicia using binary coded numbers and light sensitive elements suitably arranged to read the numbers and connected to appropriate decoding circuits to operate indicating and recording means as desired. Such devices and techniques are well known in the art and can be applied by the persons working in the art to the specific utilizations and degrees of complexity they are interested in.

In one embodiment when binary coded decimal numbers are used as the coded indicia, one such code might be a code using binary representation and the decade position of the 0 or 1 represents a decimal number. Such a code is the commonly used 1, 2, 3, 4 code wherein the number 0 is represented by all 0's appearing in four positions, the number 1 is represented by the number 001, the number 2 is represented by the number 0010, the number 3 is represented by the number 0100 and the number 4 is represented by the number 1000. In this kind of code when it is desired to represent the decimal 5, the representations of the numbers 1 and 4 combine as follows — 1001. The numbers 6, 7, 8 and 9 are produced in a similar manner. When such a code is used, it may be used to provide an indication not only of the relationship between the images as explained in connection with the description of the embodiments of FIG. 1, but the additional available numbers could be used for other purposes. The number 4 could be used to start a tape recorder while the number 5 is used to stop it. The other available numbers may be used for whatever purposes the designer may wish.

Rather than use projection through space to a remotely positioned light sensitive element, if desired, optical fiber light transmission may be used with the optical fibers extending from the frame aperture wherein their ends would be exposed to the coded indicia to light sensitive elements. This may have the advantage of minimizing the problems of aligning and focusing remotely positioned light sensitive elements. Alternatively, the coded indicia may be provided by the use of magnetic particles in a carrier in the manner well known in the art so that when they are moved past a reading head, an electrical signal is developed for control purposes. In the case of motion picture film, the movement of the film would provide the relative motion between the reading head and the magnetically coded indicia. In the case of film strips or slides where the frame is stationary, the magnetic reading heads may be rotated to provide the necessary relative motion. Other means may be used such as color coding using light sensitive elements responsive only to certain colors.

Further, it is clear that various means may be provided for indicating and/or recording the answers given. For instance, it may be desired to accelerate for presentation of various images and associated questions as the user is able to respond at a more rapid rate. Thus, a suitable timing means could be provided to measure the interval between the presentation of the question and the receipt of the response and to decrease the time of presentation as the observer develops the facility of responding at a more rapid rate.

Figure 17:
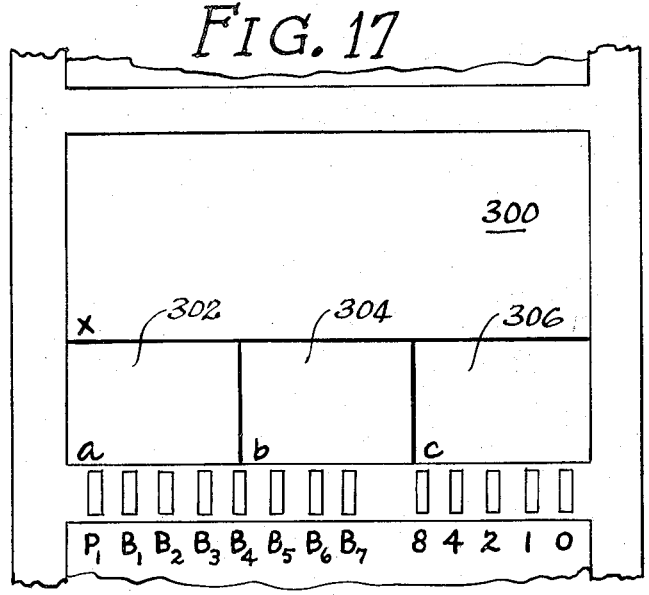
FIG. 17 is an illustration of a frame on a standard film strip showing the codes which may be provided in the frame lines.

In an embodiment of the invention incorporating the features described generally above, a film strip having frames as shown in FIG. 17 may be used. In the frame illustrated, a large discrete section 300 is superimposed over three smaller discrete sections 302, 304 and 306. Inbetween the frame lines are a plurality of code positions, $P_1$, $B_1$ through $B_7$ and 8, 4, 2, 1 and 0. The code positions are shown in white to represent a specific location where the film may be exposed to permit the transmission. Thus, when a particular code is desired, one or more code positions may be exposed while the rest are maintained opaque. Light transmitted through an exposed code position will then be effective in the circuits to be described hereinafter to effect the desired functions.

In the embodiment illustrated, the code positions $P_1$ and $B_1$ through $B_7$ are to control the operation of the machine while the code positions 8, 4, 2, 1 and 0 are used to determine which one or more of the screen sections when pushed will indicate that a desired response has been evoked.

Figure 18:
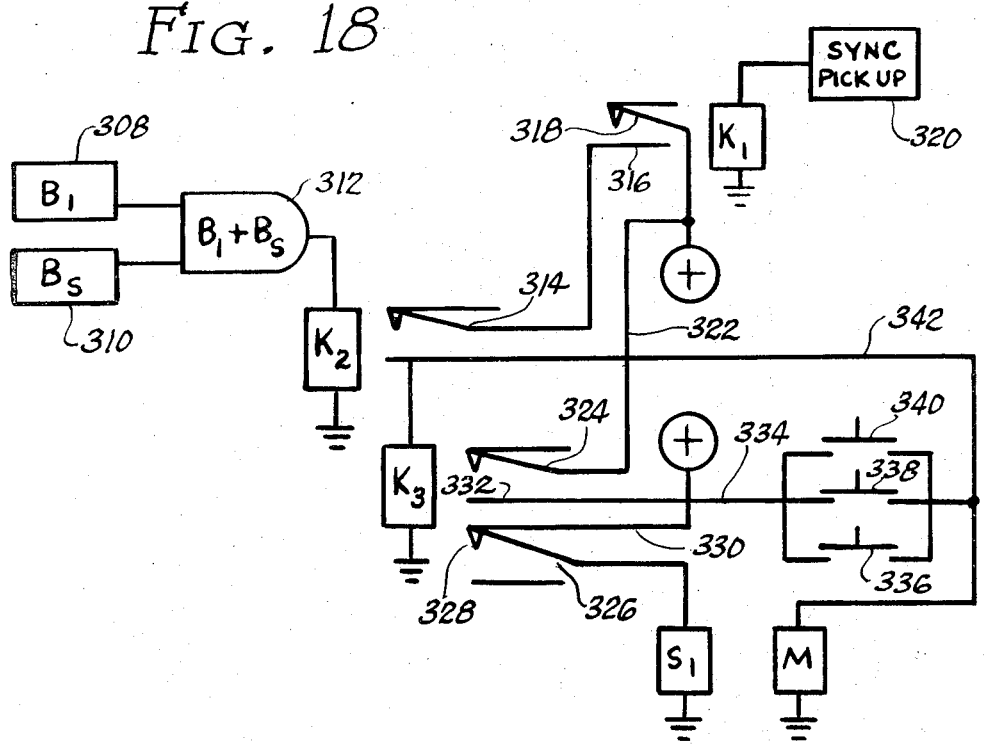
FIG. 18 is an illustration of the circuit logic which is provided to obtain a first mode of control capability.

Referring now to FIG. 18, a circuit is shown which may be used to effect in conjunction with selected code positions on the film a first desired function. In one mode of use of the machine the following sequence of operations may be desired:

1. The response code is such that pushing one small screen represents the response desired to be evoked; and
2. When the desired response is evoked the tape is to be started to present an audio message and the film advanced simultaneously and very rapidly to present a visual message.

A particular application of such a mode of operation may be in a teaching or learning situation where an animal is shown on the large screen and the same animal is shown on one movable small section while two different animals are shown on the other two small sections. The response code is such when the user presses the small section with the same animal on it the tape may start and the audio message may be the words "You're right" or the sound the animal makes. At the same time the film is advanced very rapidly, faster than the ability of the eye to see, and an enlarged picture of the animal may be shown occupying all of the screen sections. Thus, there is an audible and visible reinforcement to the user.

In FIG. 18, 308 and 310 designate light pick-up devices positioned to respond when light is transmitted through the $B_1$ and $B_5$ code positions, respectively. The outputs of the light pickups are supplied to an "AND" circuit 312. The output of 312 is supplied to the coil of a relay $K_2$ operating a movable contact 314. The contact 314, illustrated in the position it assumes when $K_2$ is de-energized, is connected to the stationary contact 316 of a relay $K_1$ operating a movable contact 318. The relay $K_1$ is connected to a sync-pickup 320. The sync-pickup includes a pick-up head positioned to respond to synchronizing signal records on a track provided for that purpose on a magnetic tape. The magnetic tape is of course mounted in a tape playback device forming a part of the device and includes an audio track.

The movable contact 318 is connected to a source of supply voltage which is also connected through a conductor 322 to a first movable contact 324 of a latching relay $K_3$. The relay $K_3$ also includes a second movable contact 326 which when $K_3$ is de-energized is connected via a stationary contact 328 and a conductor 330 to the source of supply voltage. Included in the relay $K_3$ is stationary contact 332 connected via a conductor 334 to switches 336, 338 and 340 operated by the movable screen sections. For ease of explanation the connection to the switches 336, 338 and 340 is shown as being such that the closure of any one of them will complete a circuit. However, as will be understood from FIGS. 22 and 23 and their accompanying description, the circuit controlled by the response will enable only a selected one or more of these switches to be effective to complete a circuit. To complete the description it may be seen that the movable contact 326 is contacted to a tape control solenoid $S_1$ while the other sides of the switches 336, 338 and 340 are connected to a motor M for advancing the film and via conductor 342 to the latching relay $K_3$.

The operation of the circuit of FIG. 18 is as follows: When code positions $B_1$ and $B_5$ are binary ones, that is, exposed so that light may be transmitted therethrough and detected by pickups 308 and 310 and circuit 312 has a binary 1 output and energizes the relay $K_2$, the energization of relay $K_2$ operates contact 314 to complete a circuit to stationary contact 316 of relay $K_1$. When a synchronizing pulse is picked up from the tape, relay $K_2$ is momentarily energized operating contact 318. The operation of contact 318 completes a circuit from the power source to relay $K_3$ energizing it to its latched position. Up to this point the tape solenoid $S_1$ had been energized via the movable contact 326, stationary contact 328 and conductor 330 but with the operation of $K_3$ contact 326 is moved to open that circuit and the tape stops. At the same time movable contact 324 is operated to connect the power source through the conductor 322, movable contact 324, stationary contact 332 and conductor 334 to the selected one or more of the switches 336, 338 and 340.

If the desired one or more of the switches is closed by pushing its associated press-screen section, the film advance motor M is operated to advance the frame. The completion of a circuit by a closure of one of the switches 336, 338 or 340 completes a circuit to the latching relay $K_3$ from the power source, conductor 322, movable contact 324, stationary contact 332, conductor 334, one of the switches 336, 338 or 340 and conductor 342 to energize latching relay $K_3$ to open position. When $K_3$ opens, contact 326 operates to energize the tape solenoid to cause tape movement. With the advancement of the film a frame with a new operations code is then effective to control the next operation of the machine.

Included within the machine is the circuitry shown in FIG. 19. In this figure, a light pickup 344 is connected with the light pickup 310 to the input of an and circuit 346. The output of the and circuit is connected to the coil of a relay $K_4$ having a movable contact 348 and a fixed contact 350. The movable contact 348 is connected via conductor 352 to the fixed contact 316 of the relay $K_1$ while the fixed contact is connected via a conductor 354 to the film advance motor M.

The circuit of FIG. 19 and its associated control code can be used where it is desired to advance the film as a narrative is presented by the tape as the film advances during the narrative.

When pickups 310 and 344 are energized, 346 supplies a pulse to pick-up relay $K_4$. This competes a circuit from the motor M via conductor 354, fixed contact 350, movable contact 348 and conductor 352 to fixed contact 316. When a synchronizing pulse is detected by pickup 320, relay $K_1$ operates contact 318 connecting the motor M to the power source to advance the film and bring the next frame and its control code into position.

In the event it is desired to provide for a film advance and the control of an external element such as resetting a counter, etc., the circuit of FIG. 20 included within the machine and its control code may be used. In this case, the control code consists of binary ones in $B_5$, $B_2$, $B_1$, and $P_1$ positions. As may be seen, this includes the control codes of FIGS. 18 and 20 plus the $P_1$ position. Thus, the pickups 308, 310 and 344 are connected to an and gate 356 as is the output of pickup 358. The output of and gate 356 is connected to the coil of a relay $K_5$ operating movable contacts 360 and 362. The contact 362 is connected to the fixed contact 316 of relay $K_1$ while the contact 360 is connected to a conductor 364 and normally engages a fixed contact 366 connected to a conductor 368. The conductors 364 and 368 are connected in the energizing circuits of relays $K_2$ and $K_4$ so that when relay $K_5$ operates and the contact 360 moves away from contact 366 those energizing circuits are interrupted and cannot operate even though their codes appear at the frame line.

The relay $K_5$ includes a fixed contact 370 connected via a conductor 372 to the film advance motor M and the operating coil of a relay $K_6$. The relay $K_6$ operates a movable contact 374 connected to conductor 376 and includes a fixed contact 378 connected to a conductor 380.

The operation of this circuit is as follows: When pickups 308, 310, 344 and 358 provide an output the resulting output of the gate 356 causes the relay $K_5$ to be energized operating the contacts 360 and 362. When a synchronizing pulse is picked up by 320 relay $K_1$ operates momentarily to connect the power source through the contacts 316, 318, 362 and 370 and conductor 372 to the motor M and relay $K_6$. The motor advances the film one frame and relay $K_6$ is energized completing a circuit from conductor 376 to 380. A load such as a counter or any desired element may be connected to the conductors 376 and 380 and operated in response to the energization of relay $K_6$.

The machine also includes the circuit of FIG. 21 which has for its purpose the provision of a message or narrative derived from the tape after a screen is pressed and a frame is held in position for viewing.

In this circuit, the pickups 310 and 382 for the $B_3$ and $B_5$ code positions are supplied to the and gate 384. The output of the gate is supplied to a relay $K_7$ having a movable contact 386 and a fixed contact 388. The movable contact is connected to the fixed contact 316 of relay $K_1$ by a conductor 390 while the fixed contact is connected via conductor 392 to a movable contact 394 of a relay $K_9$. The relay $K_9$ includes another movable contact 396 and a pair of fixed contacts 398 and 400. The fixed contact 398 is connected via conductor 402 to one side of the switches 336, 338 and 340 while the fixed contact 400 is connected to the motor M and a reset input of counter 404 by a conductor 406.

Another fixed contact 408 of the relay $K_9$ is the input of the counter 406 by a conductor. Also connected to the input of counter 404 by means of the conductor 412 are the selected one or more of the switches 336, 338 and 340. One output of the counter 404 is via a conductor 414 to the input of a first and gate 416 and a second and gate 418. The second output of the counter 404 is connected via a conductor 420 to the inputs of gates 416 and 418. The output gate 416 is connected to the coil of a relay $K_8$ while the output of gate 418 is connected to the coil of relay $K_9$. Relay $K_8$ has a movable contact 420 and a fixed contact 422. The contact 420 is connected to tape solenoid $S_1$ while the contact 422 is connected to the power source.

When pickups 310 and 382 are energized, gate 384 picks up relay $K_7$. At this time the tape solenoid $S_1$ is picked up because relay $K_8$ is de-energized. After relay $K_7$ picks up, when a synchronizing pulse is picked up by 320, relay $K_1$ closes momentarily and power is supplied via contacts 316, 318, conductor 390, operated contact 386, fixed contact 388, conductor 392, movable contact 394, fixed contact 408, conductor 410 and a pulse input is supplied to the counter 404. This sets the counter so that its first output has a binary one thereon while its second output a binary zero. Under these circumstances, the gate 416 has an output picking up the relay $K_8$. When relay $K_8$ is picked up, contact 420 is operated dropping out the tape solenoid $S_1$ to stop the tape.

When one or more of the switches 336, 338 or 340 is closed a second pulse is supplied to the counter 404. This pulse is derived via the power source, the movable contact 318 of relay $K_1$ and a fixed contact 424 of that relay connected via a conductor 426 to movable contact 396 and fixed contacts 398 of relay $K_9$, conductor 402, selected switch or switches 336, 338 or 340 and conductor 412. The second pulse input to the counter 404 causes a reversal in the states of its two outputs and therefore the gates 416 and 418. Thus, the relay $K_8$ drops so the tape solenoid is energized starting the tape. At the same time relay $K_9$ picks up opening the contacts 396 and 398 disenabling the switches 336, 338 and 340. Movable contact 394 operates to complete a circuit from the fixed contact 316, conductor 390, movable contact 386, fixed contact 388, conductor 392, movable contact 394, fixed contact 400 and conductor 406 to the motor M and the reset input of counter 404. Thus, with the tape moving, when 320 picks up the next synchronizing pulse and relay $K_1$ momentarily operated, the frame is advanced and the counter reset.

The foregoing has been a description of various control codes and circuits that can be provided. The response codes and their associated circuits are shown in FIGS. 22 and 23.

Figure 22:
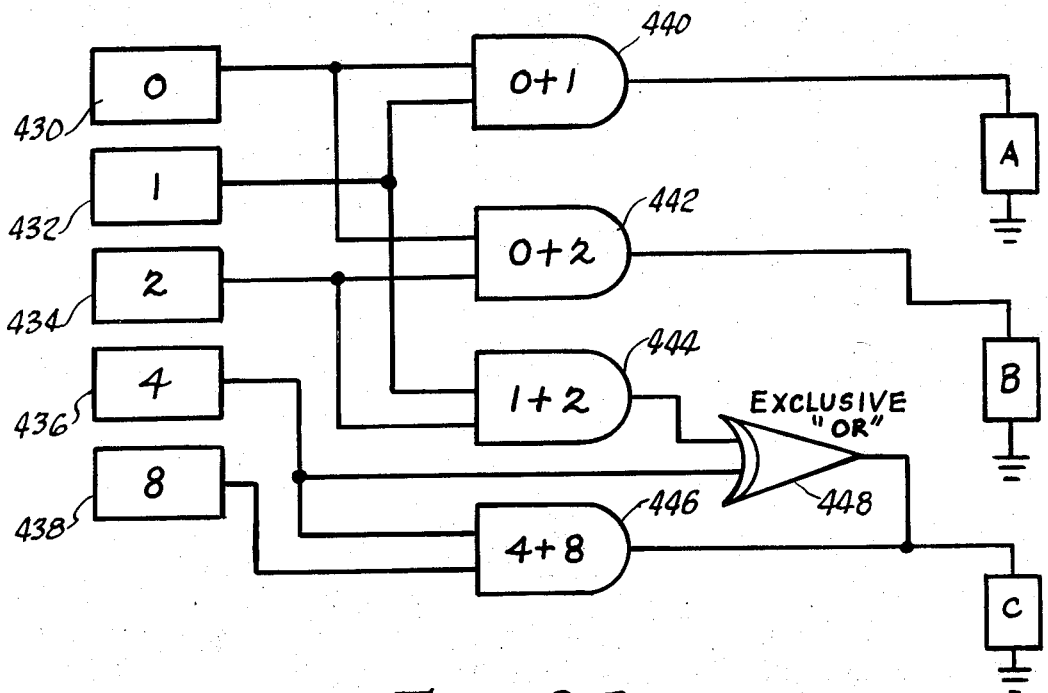
FIG. 22 is an illustration of the circuit logic which may be provided for establishing a relationship between the screen sections desired to be evoked.
Figure 23:
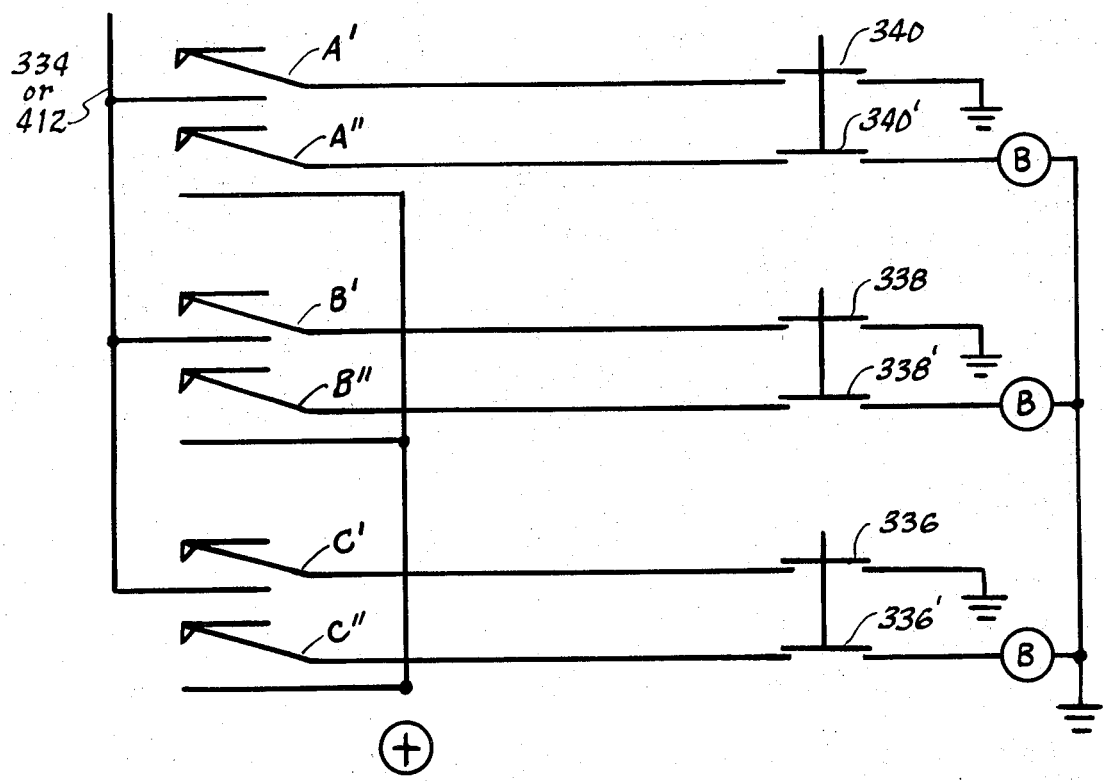
FIG. 23 is a diagrammatic illustration of the circuits for permitting the energization of one of the movable screen sections.

In FIG. 22, pickups 430 through 438 are supplied to inputs to various and gates 440, 442, 444 and 446 and the exclusive or gate 448. As may be seen, the gate 440 responds to inputs from the pickups 430 and 432, the gate 442 to inputs from the pickups 430 and 434, the gate 444 to inputs from the pickups 432 and 434 and the gate 446 to inputs from the pickups 436 and 438. The exclusive or gate 448 may be simultaneous inputs from the pickups 432 and 434 or a single input from pickup 436. The output of each gate is connected to one relay connected in the circuits including the press screen operated switches 336, 338 and 340. Thus, relay A is energized upon an output from gate 440, relay B upon an output from gate 442 and relay C upon an output from gate 444, pickup 436 or gate 446.

As may be seen each relay A, B and C operates a pair of movable contacts indicated by the primed and doubled primed letters designating them. When any one or more of the relays A, B or C is energized, their movable contacts are operated. The contacts designated by the primed character connects its associated switch in a circuit with associated conductors of the control circuits described above. The contacts designated by the double primed characters connect their associated lights B in circuit with a power source. Each of the switches 336, 338 and 340 also operate switches 336', 338' and 340', respectively, so that when those switches are operated and associated light is lit to provide an indication to the viewer that the desired response has been evoked. Each lamp is arranged so that the light emanating therefrom will be visible only through the visible screen section with which it is associated.

Another modification may take the form of a means other than a film strip projector and associated screen. Thus, there could be provided a video projector system utilizing either discrete screen sections or individual video tubes to be actuated by an observer so as to indicate his response. The video projection may be from a live presentation or may be from recorded video tape. When a video projector system is used, which utilizes only a single tube and derives its discrete images from a video recording system or live presentation, there may be provided a transparent stream in front of the video tube which is composed of discrete sections, some of which may be movable to provide for receiving the observer's response.

Other modifications and embodiments will suggest themselves to those skilled in the art and it is intended by the claims to cover all embodiments within the scope of the invention.

What is claimed is:

1. Response-evoking apparatus comprising:
a viewing surface having a plurality of discrete screen sections;
means for projecting images from an image storage medium on said discrete screen sections, said projecting means including image changing means;
image control means operating said image changing means;
means for detecting a recorded signal on a signal recording medium;
means for advancing the signal recording medium;
signal control means for operating said means for advancing the signal recording medium;
first selectively enabled control means responsive to a detected recorded signal to operate said image control means to change the image;
means operatively connected to some of said discrete screen sections responsive to an observer's response to a projected image manifested by the observer's touch of one of said discrete screen sections and providing an indication of that response;
second selectively enabled control means responsive to the indication of an observer's response for operating said image control means to change the image;
third selectively enabled control means responsive to a recorded signal to operate said signal control means to stop said means for advancing the signal recording medium;
fourth selectively enabled control means responsive to an indication of an observer's response for operating said signal control means to start said means for advancing said signal recording medium;
separate control means connected to each of said first, second, third and fourth control means for enabling the control means to which it is connected; and
means responsive to coded indicia recorded on the image storage medium and operatively connected to said separate control means for operating one or more of said separate control means to enable its associated first, second, third or fourth control means depending upon the code recorded.

2. A response-evoking apparatus as set forth in claim 1 wherein at least said some of said discrete screen sections are movable in response to an observer's touch thereof.

3. A response-evoking apparatus as set forth in claim 2 wherein said projecting means projects discrete images within said discrete screen sections.

4. A response-evoking apparatus as set forth in claim 3 wherein one of said discrete screen sections is larger than the remainder of said discrete screen sections.

5. A response-evoking apparatus as set forth in claim 4 wherein the discrete screen sections are movable and wherein said means responsive to an observer's response includes a plurality of switches, each separately operable in response to the motion of its associated movable discrete screen section.

6. Response-evoking apparatus comprising:
a viewing surface having a plurality of discrete screen sections at least some of which are movable;
means for projecting images from an image storage medium on said discrete screen sections, said projecting means including image changing means;
image control means operating said image changing means;
detecting means for detecting a recorded signal on a signal recording medium;
means for advancing said signal recording medium;
signal control means for operating said means for advancing the signal recording medium;
control circuit means connected between said detecting means and said signal control means and said image control means;
said control circuit means including a plurality of distinct selectively enabled control paths connecting said detecting means to said image control means and said signal control means;

a plurality of first selecting means each individually connected to one of said control paths to enable the control path to which it is connected;

a plurality of response means operatively connected to said movable discrete screen sections selectively enabled for receiving an observer's response, manifested upon one of said movable discrete screen sections to move the same, to a projected image and providing an indication of that response;

a plurality of second selecting means each individually connected to one of said response means to enable the response means to which it is connected;

means responsive to coded indicia on the image storage medium for operating one or more of said selecting means to enable its associated control path depending upon the code recorded; and further means responsive to coded indicia on the image storage medium for operating one or more of said second selecting means to enable its associated responsive means depending upon the code recorded.

7. A response-evoking apparatus as set forth in claim 6 including selectively enabled means connected to said response means and to said image control means for operating said image control means to change the image being projected.

8. A response-evoking apparatus as set forth in claim 7 wherein one of said discrete sections is larger than the remainder of said discrete screen sections.

9. A response-evoking apparatus as set forth in claim 8 wherein said projecting means projects discrete images within said discrete screen sections.

10. A response-evoking apparatus as set forth in claim 9 wherein the smaller of said discrete screen sections are movable and wherein said means for receiving an observer's response includes a plurality of switches each separately operable in response to the movement of its associated movable discrete screen section.

* * * * *